[54] TRIMMING CERAMIC FLATWARE

[75] Inventors: Robert Gater, Rode Heath; Peter A. Pass, Werrington, both of England

[73] Assignee: Service (Engineers) Limited, Stoke-on-Trent, England

[21] Appl. No.: 500,968

[22] Filed: Jun. 3, 1983

[30] Foreign Application Priority Data

Jun. 5, 1982 [GB] United Kingdom ................. 8216438

[51] Int. Cl.[3] .............................................. B23P 23/00

[52] U.S. Cl. ...................................... 29/564; 29/33 A; 51/101 R; 198/394; 414/225; 425/106; 425/268

[58] Field of Search ............... 51/101 R, 229; 425/94, 425/99, 104, 106, 266, 265, 268, 267, 296, 324.1, 340, 383, 403.1, 93; 33/180 R, 181 R; 198/394, 345, 454; 29/33 R, 33 A, 564; 414/752, 225; 53/367

[56] References Cited

U.S. PATENT DOCUMENTS

| | | | |
|---|---|---|---|
| 2,826,872 | 3/1958 | Robbins | 51/101 R X |
| 3,221,374 | 12/1965 | Fornes | 53/367 X |
| 3,355,856 | 12/1967 | Randrup | 198/345 X |
| 3,865,254 | 2/1975 | Johannsmeier | 198/394 X |
| 3,890,508 | 6/1975 | Sharp | 198/394 X |
| 4,064,656 | 12/1977 | Ulivi | 51/101 R X |
| 4,219,319 | 8/1980 | Gater et al. | 425/383 X |
| 4,406,091 | 9/1983 | Eckardt et al. | 51/101 R |
| 4,426,811 | 1/1984 | Eckardt et al. | 51/101 R |

FOREIGN PATENT DOCUMENTS

| | | | |
|---|---|---|---|
| 1913583 | 10/1970 | Fed. Rep. of Germany | 425/93 |

*Primary Examiner*—Gil Weidenfeld
*Assistant Examiner*—Glenn L. Webb
*Attorney, Agent, or Firm*—Scrivener, Clarke, Scrivener & Johnson

[57] ABSTRACT

Dust-pressed plates (P) are trimmed to a predetermined peripheral profile by means of three milling cutters rotating at around 12,000 r.p.m. The cutters are uniformly spaced about a central axis and operate simultaneously on the periphery of a plate while the plate is rotated about the axis. The cutters are located during trimming by means of a profile cam which is in registration with the plate mounted on a ware support. To ensure registration with the cam, a plate is centered by a centering unit before being orientated by orientating mechanism and transferred to the ware support. Each plate is delivered to the centering unit with a reference feature at a predetermined position on its periphery, the orientating mechanism being arranged to search for that feature before rotating the plate to bring it into the required orientation for registration with the cam.

9 Claims, 16 Drawing Figures

TRIMMING CERAMIC FLATWARE

This invention is concerned with improvements in or relating to the trimming of articles of ware in the manufacture of ceramic flatware.

Ceramic flatware is traditionally formed from moist clay by spreading clay, in what is commonly referred to as its plastic state, over the surface of a mould (which is usually of plaster) and shaping the clay against the mould by means of a suitable tool. Most commonly, at least in mechanised production, a rotating roller tool is used to spread and shape the clay. When the clay has been so spread and shaped, it is usually necessary to trim surplus clay from the periphery of the article.

It is usual for ware to be so produced from clay with a moisture content of around 21% (by weight). During shaping, and before removal of the article from the mould, the clay is relatively soft and trimming can be effected simply by means of a single blade which is run around the mould (or, and which is more usual in mechanised production, the mould may be rotated to move the periphery of the article past a fixed blade). After drying and removal from the mould, the periphery of the article may be smoothed by means of wet sponges; commonly, lengths of wet sponge are run against the article, in a direction transversely of the article's periphery. This sponging operation can be done to the article in either the leatherhard state (around 12% moisture content) or in the white dried condition (less than 4% moisture content).

Whilst with circular, and oval, ware it can be easy enough to use a simple blade to trim articles before removal from their moulds, problems arise with more complicated peripheral profiles. In particular, scalloped forms have required special attention. For production of scalloped ware, and in an effort to eliminate the need for trimming after shaping on the mould, it has been known to employ moulds which provide a channel around the periphery of the article-shaping mould surface, and complementarily to use a tool which squeezes excess clay in to the channel in forming an article on the mould. The clay in the channel remains joined to the periphery of the article by a very thin web of material and, upon removal of the article from the mould, after drying and shrinkage which gives mould release, the ring of material from the channel can be simply broken away from the periphery of the article. The rough, but fairly precise, periphery of the article can then be smoothed by means of sponging alone. This method of forming scalloped ware, although giving a good quality edge creates many problems, including the disadvantages arising from the need for a relatively complicated mould form.

More commonly the problems of producing good scalloped ware have simply been avoided by compromising on the quality of the scalloped form. That is to say, more-or-less standard edge-finishing techniques have been applied and the quality of the scalloped form sacrificed; in particular, what has been generally accepted is that in edge-finishing the ware too much material will be removed from the "peaks" and too little from the "troughs", resulting in a somewhat smoothed-out scalloped form.

There is a further context in which conventional trimming methods have been found to be inadequate, and that is in the manufacture of ceramic ware by dust pressing. In dust pressing, clay material in the form of fine particles (which typically may have a moisture content of 4%-6% by weight) is compressed between dies. As with manufacture from plastic clay, it is generally preferable that the material be free to flow beyond the periphery of the ware-shaping surfaces, and a subsequent trimming operation is usually necessary. With scalloped ware, similar edge-finishing problems arise as in formation from plastic clay, but a further problem arises from the hardness of the article to be trimmed; whereas in the case of an article formed from plastic clay, trimming can be effected whilst the clay is still soft, in the case of a dust-pressed article the hardness, even immediately after pressing, will generally be greater than that of plastic-made articles in the leatherhard, or even the white dried, condition.

Conventional edge-finishing techniques, using simple blades and/or wet sponges, have been found to be inadequate for trimming hard dust-pressed ware. Much work has gone into finding techniques which would enable the ware to be edge-finished at a sufficiently fast speed to be commercially acceptable; spring steel scrapers, bundles of emery cloths, flails (to trim by chipping away the edge of the ware) and various other techniques have all been tried, by various manufacturers, but found wanting.

It is an object of the present invention to provide an improved method of trimming the periphery of an article of ware in the manufacture of ceramic flatware, which method is applicable to the trimming of dust-pressed scalloped ware.

In one of its aspects the invention provides a method of trimming the periphery of an article of ware in the manufacture of ceramic flatware in which surplus material is removed progressively along the periphery by means of a rotating rotary trimming tool which is caused to trim the article to a predetermined profile.

Whilst it might be possible to use some form of grinding wheel as the rotary tool, we prefer to use a rotary cutter. The cutter may be a conventional small milling cutter such as a solid carbide burr, as used in general engineering, and may typically have a mean diameter of around 7-15 mm; such burrs comprise elements of tungsten carbide providing a plurality of cutting edges arranged around a body of, for example, cylindrical, frusto-conical, or dumb-bell shape. We have found that it can be desirable, to avoid chatter and chipping of the ware, for the cutter to be rotated at at least 5,000 r.p.m., and in some circumstances as much as 15,000 r.p.m., when trimming an article of ware. Such a cutter would, of course, normally be rotated with its axis extending transversely of the periphery of an article of ware being trimmed, though not necessarily with its axis parallel to the ware axis.

To effect trimming, we have found that a suitable speed of relative rotation between the article of ware and the rotating cutter may be of the order of 6 to 10 r.p.m., though we have found that a speed as high as 16 r.p.m. can be satisfactory. Clearly, precise speeds chosen in any particular circumstances will depend upon various factors, which may include the diameter and exact form of the cutter, the diameter of the article of ware to be trimmed, the amount of surplus material to be removed from the article, and the profile to which the article is to be trimmed.

By means of a rotary trimming tool, operating to trim an article to a predetermined profile (which may, we have found, be achieved simply by means of a profile cam and follower arrangement) we have found that it is possible to trim articles of ceramic ware accurately and quickly to complex profiles such as deep scalloped forms. Furthermore, we have found that dust-pressed articles can be trimmed in this manner without difficulty.

In another of its aspects the invention provides apparatus suitable for use in a method as set out in the last preceding paragraph but three, the apparatus comprising tool-mounting means, article-mounting means, tool-advancing means whereby relative movement can be caused between a rotating rotary trimming tool mounted on the tool-mounting means and an article of ware mounted on the article-mounting means, to cause the tool to trim the article progressively along its periphery, and tool-locating means whereby the tool is so caused to trim the article to a predetermined profile.

We have found that the tool-locating means may conveniently comprise a profile cam in registration with which an article is located on the article-mounting means in use of the apparatus, a cam follower associated with the tool-mounting means, and engaging means whereby the cam follower can be urged into contact with the profile cam and maintained in contact with the cam during trimming of the article.

The tool-mounting means may comprise an air, electric or other motor arranged to rotate a tool mounted thereon. The article-mounting means may comprise a conventional kind of ware support on to which an article can be held down by applied vacuum. The tool-advancing means may comprise means arranged to rotate an article on the article-mounting means, to cause the periphery of the article to be moved progressively past the tool during trimming.

The use of more than one tool in trimming an article may be of advantage in shortening the time for trimming the whole of the periphery. Accordingly, there may be a plurality of tool-mounting means uniformly distributed around the article-mounting means, to enable simultaneous trimming of each of a plurality of portions of the periphery by separate tools. In a preferred arrangement, there is provision for the simultaneous use of three tools, distributed at 120° intervals about the article-mounting means.

Where articles are to be fed automatically to the article-mounting means for trimming, it may be necessary for there to be provided automatic orientating means to enable an article to be located on the article-mounting means in a predetermined orientation. For example, where the tool-locating means comprises a profile cam it may be necessary that an article be located on the article-mounting means in exact registration with the cam. In a preferred system, each article of ware is formed with a reference feature (e.g. a notch, tab or colour mark) at a predetermined position in its periphery. Searching means is arranged to scan the periphery of an article progressively from a datum position until a predetermined disposition relative to the reference feature is assumed, at which point it stops. The searching means is then caused to return to its datum position whilst the article is rotated to maintain said relative disposition, so moving the reference feature to a position corresponding with the datum position. The article is then in a predetermined orientation for further handling.

Such orientating means could be useful both in other circumstances in the manufacture of ceramic ware and also in other technical fields.

The invention provides, in yet another of its aspects, apparatus suitable for use in orientating an article about an axis, the article being provided with a predetermined reference feature on a predetermined radial line from said axis, the apparatus comprising article-supporting means whereby the article can be supported for rotation about said axis, searching means arranged to advance about said axis progressively from a datum position until a predetermined disposition relative to said reference feature is assumbed, and means whereby the article will be rotated about said axis to maintain said relative disposition as said searching means thereafter returns to its datum position, so to bring said reference feature to a position corresponding with said datum position and said article to a predetermined orientation.

The searching means may comprise a searching head which is mounted for rotation about said axis, the head being operatively connected to the article-supporting means by means whereby the head and the article-supporting means rotate together about the axis when the head returns but not when the head advances. Such operative connection may be achieved by means of a sprag clutch mechanism.

In a preferred construction, the searching head is in the form of a pivotally mounted arm, means for detecting the reference feature being mounted on the arm to one side of the pivot axis, and actuating means arranged to pivot the arm about the axis in advance and return movements being arranged to act upon the arm at a position on the opposite side of the axis.

The article-supporting means can comprise a sucker to which vacuum can be applied to hold an article, the sucker being mounted for rotation about the axis.

The detecting means, enabling the searching means to detect the reference feature, may comprise photoelectric means.

There now follows a detailed description, to be read with reference to the accompanying drawings, of edge-finishing apparatus and its use, which illustrates the invention by way of example.

In the accompanying drawings:

FIG. 1 is a schematic plan view of the apparatus;

FIGS. 2(*a*) to 2(*j*) illustrate sequential stages in one cycle of operation of the apparatus;

Figure 1:
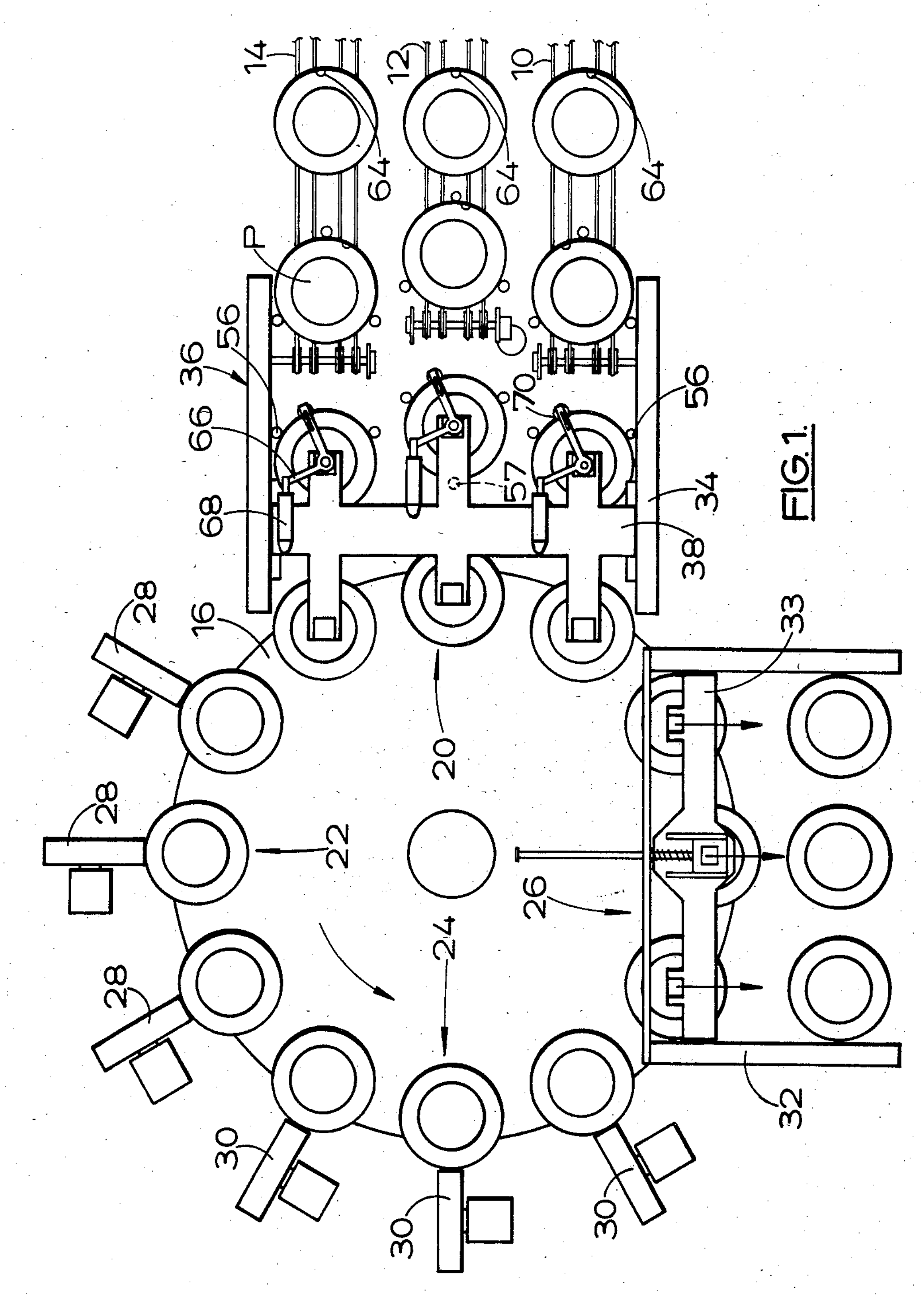
Figure 2A:
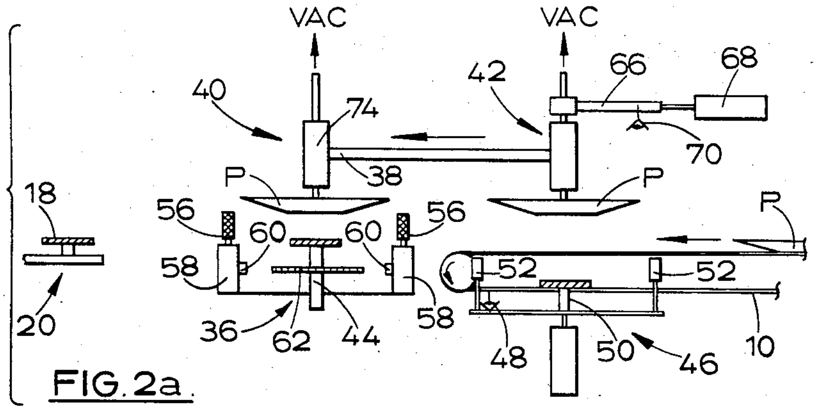
Figure 2B:
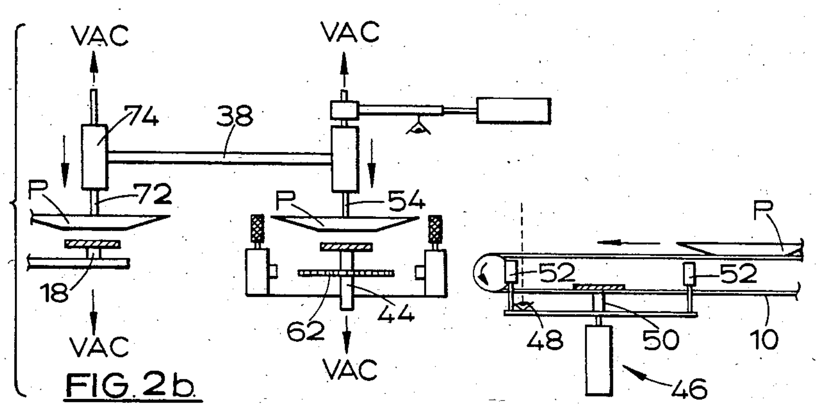
Figure 2C:
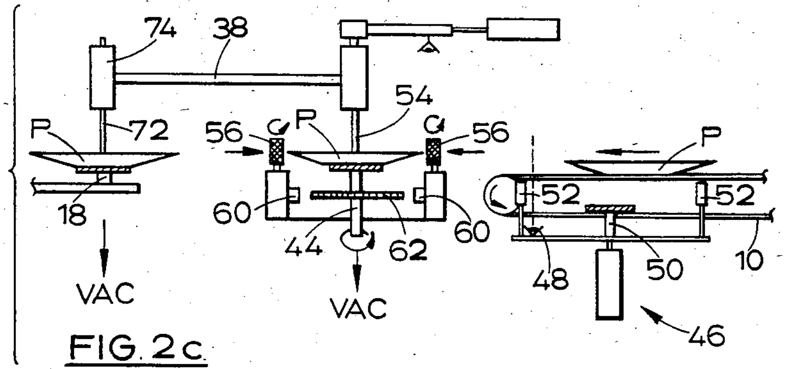
Figure 2D:
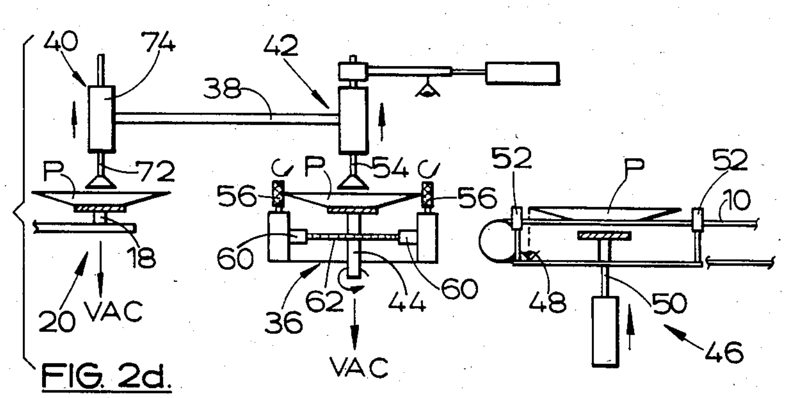
Figure 2E:
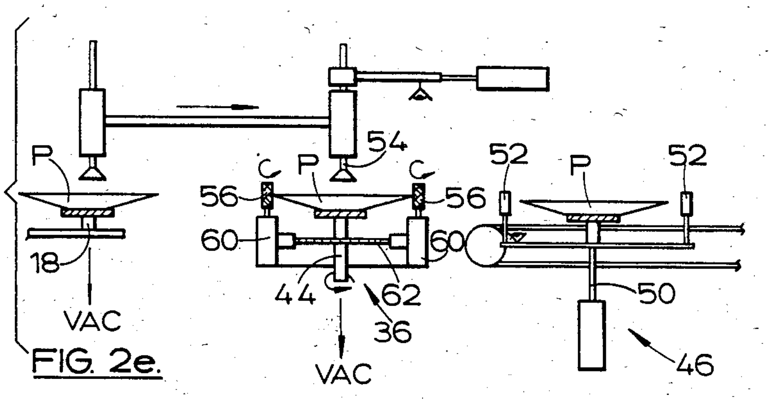
Figure 2F:
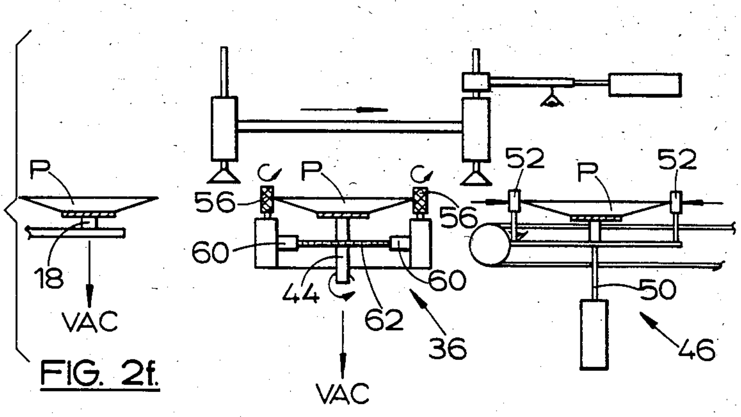
Figure 2G:
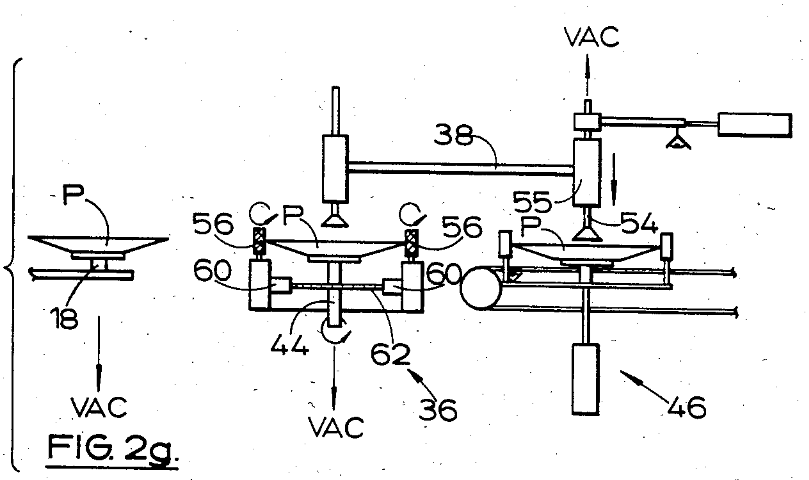
Figure 2H:
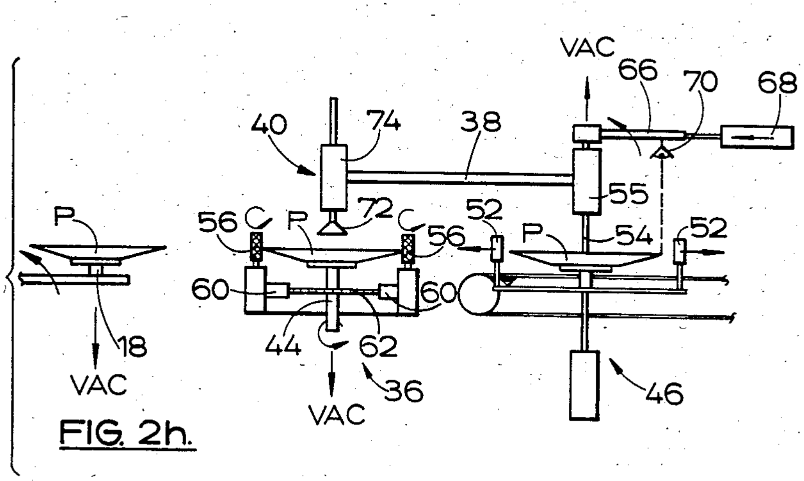
Figure 2I:
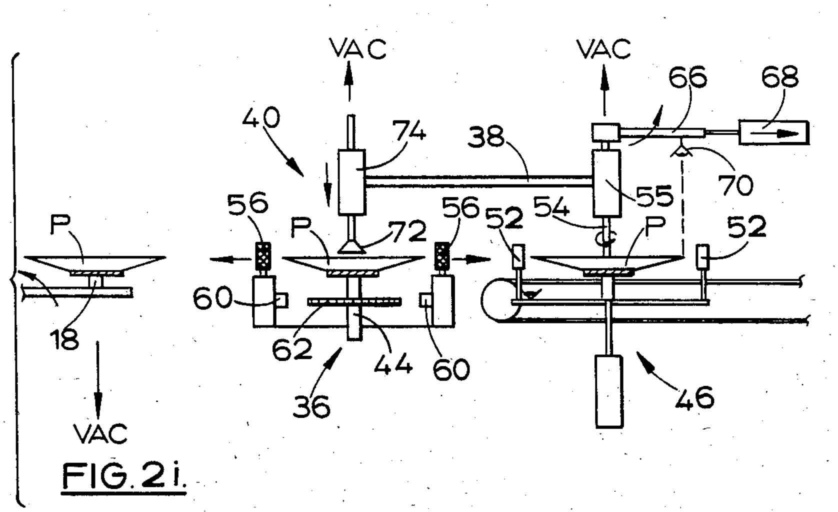
Figure 2J:
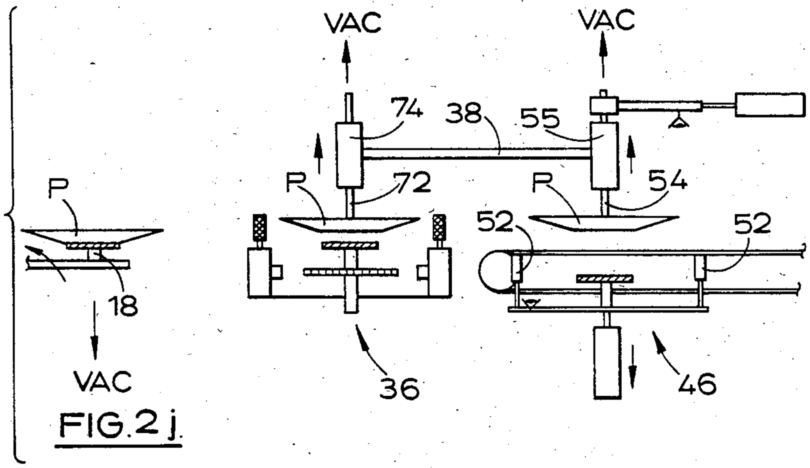
Figure 3:
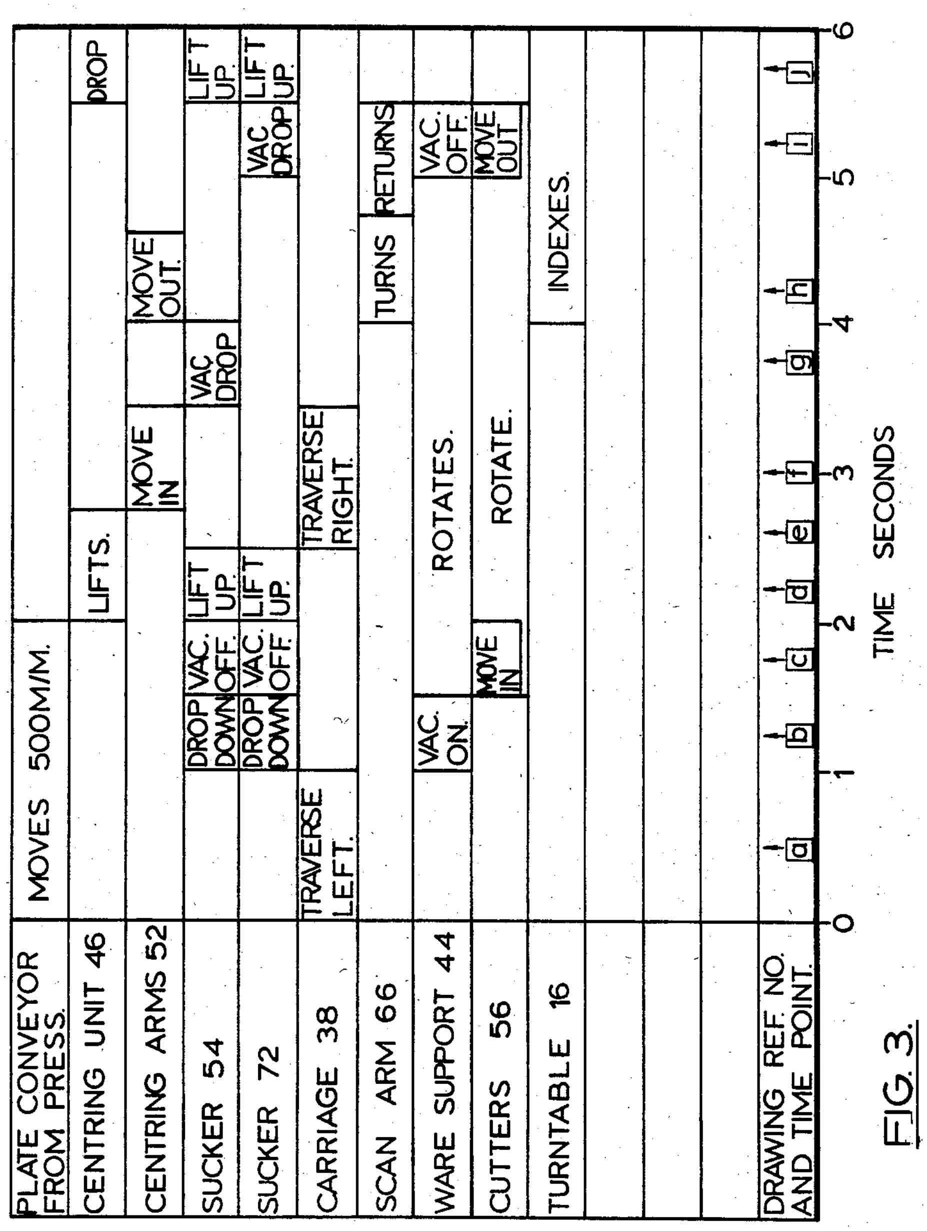
FIG. 3 is a timing chart for the cycle of operation.

The apparatus is for use in edge-finishing dust-pressed plates as they come from a making press in the manufacture of ceramic flatware. The press is not shown, and will not be described, but may comprise a making mould similar to that described in U.K. Pat. specification No. 2 064 417A. The apparatus is arranged to receive three plates at a time from the press, the plates P being conveyed from the press by three rope conveyors 10,12 and 14.

The apparatus (see FIG. 1) comprises an indexing turntable 16, comprising twelve ware supports 18 which are evenly distributed around its periphery. The turntable is arranged to be rotated through 90° in each indexing step, to convey three plates at a time (each on their own ware support) from a receiving station 20 to a first sponging station 22, from the first sponging station 22 to a second sponging station 24, and from the second sponging station 24 to a delivery station 26. Three sponging heads 28 are arranged to operate upon plates at the first sponging station 22, and three sponging heads 30 are arranged to operate upon plates at the second sponging station 24. The sponging heads 28 and 30 are of a conventional kind for smoothing the peripheries of the plates in a conventional manner. An overhead unloading mechanism 32 is arranged adjacent the delivery station 26 to pick the three plates from three ware supports newly arrived at the station, and transfer the plates to a further conveyor (not shown) for removal. The unloading mechanism 32 comprises a horizontally-linearly-reciprocable carriage 33 bearing three vertically-reciprocable sucker units (not shown) for picking up, and placing down, the plates.

The plates are delivered in threes on to the turntable 16, at the receiving station 20, by means of an overhead loading mechanism 34. As will be described in detail hereinafter, plates are delivered to the turntable via a trimming station 36. The loading mechanism 34 comprises a horizontally-linearly-reciprocable carriage 38 bearing leading and trailing sets of three vertically-reciprocable sucker units 40 and 42; the carriage 38 can be moved between a withdrawn position (relative to the turntable 16) in which the leading set 40 is directly above three ware supports 44 at the trimming station 36 and the trailing set 42 is directly above three centring units 46 beneath end portions of the rope conveyors 10,12 and 14, and an advanced position (shown in FIG. 1) in which the leading set is directly above three ware supports 18 at the receiving station 20 and the trailing set is directly above the three ware supports 44 at the trimming station 36. Thus, the arrangement is such that plates centred by the centring units 46 can be transferred firstly (by the trailing set of sucker units 42) to the trimming station 36, and secondly (by means of the leading set of sucker units 40) to the turntable 16.

As illustrated by the sequence of illustrations of FIGS. 2(*a*) to 2(*d*), the rope conveyors 10,12 and 14 are arranged to deliver plates to positions directly above the centring units 46. Photoelectric arrangements 48 are arranged to detect the arrival of plates and cause the conveyors to stop until the plates have been removed in due course by the turntable loading mechanism 34. Each centring unit is of a conventional kind comprising a vertically-reciprocable ware support 50, means (not shown) operable to raise and lower the support, and means (not shown) whereby three centring arms 52, uniformly distributed around the ware support, can be brought generally radially inwards to engage the periphery of the plate to centre it on the support. Operation of the centring units is illustrated by FIGS. 2(*d*) to 2(*f*).

With the loading mechanism 34 in its withdrawn position, as shown in FIG. 2(*g*), the suckers 54 of the trailing set of sucker units 42 are lowered vertically, by means of pneumatic cylinders 55 of the units, to engage the centred plates on the centring units 46. Vacuum is applied to the suckers (by means not shown) in order that the plates can be lifted from the centring units upon raising the suckers after the centring arms 52 have been moved out (see FIGS. 2(*h*) to 2(*j*)). The loading mechanism is then advanced, as illustrated by FIGS. 2(*a*) to 2(*c*), and the suckers 54 lowered to place the plates on to the ware supports 44 at the trimming station 36. Each ware support 44 is associated with vacuum-applying means (not shown) and vacuum is applied to hold the plates down on the supports. Vacuum is taken off the suckers 54, allowing the suckers to be raised, as shown in FIGS. 2(*d*) and 2(*e*), leaving the plates behind.

At the trimming station 36, three rotary cutters 56 are uniformly distributed around each ware support 44 for removal of surplus material from the peripheries of articles coming from the making press. Each cutter is a small high-speed milling cutter in the form of a solid carbide burr such as used in general engineering, the cutter comprising tungsten carbide cutting elements on a cylindrical body. Each cutter is mounted on an electric motor 58 arranged to rotate the cutter, about a vertical axis, at around 12,000 r.p.m.. As described in more detail hereinafter with reference to FIGS. 4 and 5, the three cutter and motor assemblies are so mounted that they can together be brought generally radially inwards to engage the periphery of a plate on the ware support 44. Associated with each cutter and motor assembly is a cam follower 60, and the assemblies are resiliently urged radially inwards by engaging means to positions in which the cam followers contact a profile cam 62 secured to the ware support 44; the profile cam is mounted co-axially with the ware support 44, beneath a plate on the support. Associated with each ware support 44 is cutter-advancing means whereby the support and the cam can together be rotated at a slow speed of around 6 r.p.m..

In a trimming operation, illustrated by FIGS. 2(*c*) to 2(*i*), the rotating cutters 56 are brought in to engage the periphery of a plate being slowly rotated by the rotating ware support 44. The cutters start to trim the plate immediately on engagement, and continue to move inwards until the cam followers 60 engage the profile cam 62. Thereafter, the cam followers follow the profile cam, as the cam rotates, and the cutters trim the plate to a corresonding peripheral profile as the periphery of the plate is moved progressively past the cutters. Since there are three cutters 56, arranged at 120° intervals about the axis of the ware support 44, it is only necessary for the plate to be rotated through a little over one third of a revolution to ensure that the plate becomes fully trimmed around the whole of its periphery.

When other than truly circular ware, for example scalloped ware, is being made it is of course essential that each plate deposited on the ware support 44 at the trimming station 36 is located in exact registration with the profile cam 62; the plate comes from the making press in scalloped form, and trimming is necessary only as a finishing operation on that form, and the plate must be positioned in a correct orientation with respect to the profile cam 62. Provisions for enabling the plates to be correctly orientated will now be broadly described with reference to FIGS. 1 and 2; suitable article-holding and orientating mechanism is described in more detail hereinafter with reference to FIGS. 6 and 7.

Each plate is formed in the making press with a reference feature in the form of a small notch 64 at a predetermined position in its periphery (see FIG. 1). The plate leaves the press in such an orientation that so far as possible the plate should approach the turntable loading mechanism 34 with its notch at the rear on the centre-line of the rope conveyor. In practice, of course, the notch will usually end up displaced by a few degrees to one side or the other of the centre line. Mounted on the carriage 38 of the loading mechanism 34, are three horizontally-lying searching heads comprising scanning arms 66. Each arm 66 is secured by way of a one-way rotational clutch to one of the suckers 54 of the trailing set of sucker units 42, in order that upon a clockwise rotation of the arm (as seen from above, as in FIG. 1) the arm will rotate on its own, and upon an anti-clockwise rotation the sucker will be rotated with the arm. A pneumatic cylinder 68 is coupled to one end of the arm 66 to effect rotations of the arm. Mounted on the other end of the scanning arm is a photocell 70 which looks vertically downwards. With the arm in a datum position, at one end of the stroke of the cylinder 68, the photocell 70 lies on a radius of the arm displaced 22½° anti-clockwise from the centre-line of the rope conveyor 10. The cylinder 68 is arranged to rotate the arm 66 from its datum position, through a maximum of 45° clockwise.

FIGS. 2(*h*) and 2(*i*) illustrate the orientating technique. As hereinbefore described, when a plate has been centred by a centring unit 46, a sucker 54 of the turntable loading mechanism 34 (in its withdrawn position) comes down and grips the plate. The centring arms 52 are then moved out (FIG. 2(*h*)). Before the plate is lifted away, for transfer to the trimming station 36, orientation of the plate is effected. The scanning arm 66 is at this stage directly above (and co-axially aligned with) the centring unit 46, and the photocell 70 is arranged to be at the same radial distance from the axis of the arm as the notch 64 is from the axis of the centring unit 46. A light source (not shown) is arranged at the same radius again, beneath the periphery of the plate. As shown in FIG. 2(*h*), the scanning arm is then advanced clockwise from its datum position, by means of the cylinder 68, to enable the photocell 70 to scan the periphery of the plate. Rotation continues until the photocell 70 detects light passing up through the notch 64, being then directly above the notch. Rotation of the scanning arm 66 is immediately stopped and reversed, to return the arm to its datum position. However, as illustrated by FIG. 2(*i*), owing to the one-way clutch connection between the scanning arm and the sucker 54, the sucker and the plate held thereby are also rotated anti-clockwise in the return movement of the arm. In this way the position of the plate is automatically adjusted to bring the reference notch to a position corresponding with the datum position of the scanning arm, and each plate arriving at the centring unit is so brought to a predetermined orientation before being transferred to the trimming station 36.

During the return movements of the scanning arms 66 in orientating plates above the centring units 46, suckers 72 of the leading set of sucker units 40 of the loading mechanism 34 are lowered vertically, by means of pneumatic cylinders 74 of the units, to engage the trimmed plates at the trimming station 36. Vacuum is applied to the suckers (by means not shown) in order that the plates can be gripped and lifted from the ware supports 44 upon raising the suckers after vacuum has been taken off the supports and the trimming cutters 56 have been moved out (see FIGS. 2(*i*) and 2(*j*)). As illustrated by FIGS. 2(*a*) to 2(*d*), the loading mechanism is then advanced and the plates deposited on three ware supports 18, of the turntable 16, which are waiting at the receiving station 20. The plates, held by vacuum on the supports 18, are thereafter progressed by the turntable through the sponging stations 22 and 24 and to the delivery station 26.

The construction of the apparatus at a trimming station 36 will now be described in more detail with reference to FIGS. 4 and 5.

Each ware support 44 (see FIG. 4) comprises a vertical shaft 76 which is rotatably mounted by means of upper and lower bearings 78 and 80. A bearing-supporting housing 82 for the bearings 78 and 80 is bolted to the underside of a flat platform 84, the shaft 76 projecting upwards through an opening in the platform. A ware-supporting head 86 of a generally conventional kind is secured coaxially with the top end of the shaft 76 for rotation with the shaft.

The profile cam 62 is mounted on the shaft 76 by means of a cam-mounting plate 88. The plate 88 comprises an upstanding annular boss 90 around the shaft 76 and the cam 62 is located on the boss 90 and secured to the plate 88 by means of bolts 92. The assembly of the cam 62 and the plate 88 is rotationally located on a shoulder 89 of the shaft by a dowel 91 and is held down on the shoulder by a spacer tube 93 extending from the head 86. The cam is thus secured coaxially with the shaft 76 for rotation with the shaft.

The cutter-advancing means (see also FIG. 5) whereby each ware support 44 (and its associated cam 62) can be rotated at slow speed in a trimming operation comprises a rack member 94 held in engagement with a pinion wheel 96 which is keyed to the shaft 76 of the ware support within the housing 82. The rack member 94 is secured to a rack-carrying bar 96 which is mounted to slide lengthwise horizontally in guide brackets 98 depending from the platform 84. A fluid pressure operated cylinder 100 is arranged to drive the bar 96, and so the rack member 94, for rotation of the shaft 76 of the ware support 44 at a suitable speed.

Figure 4:
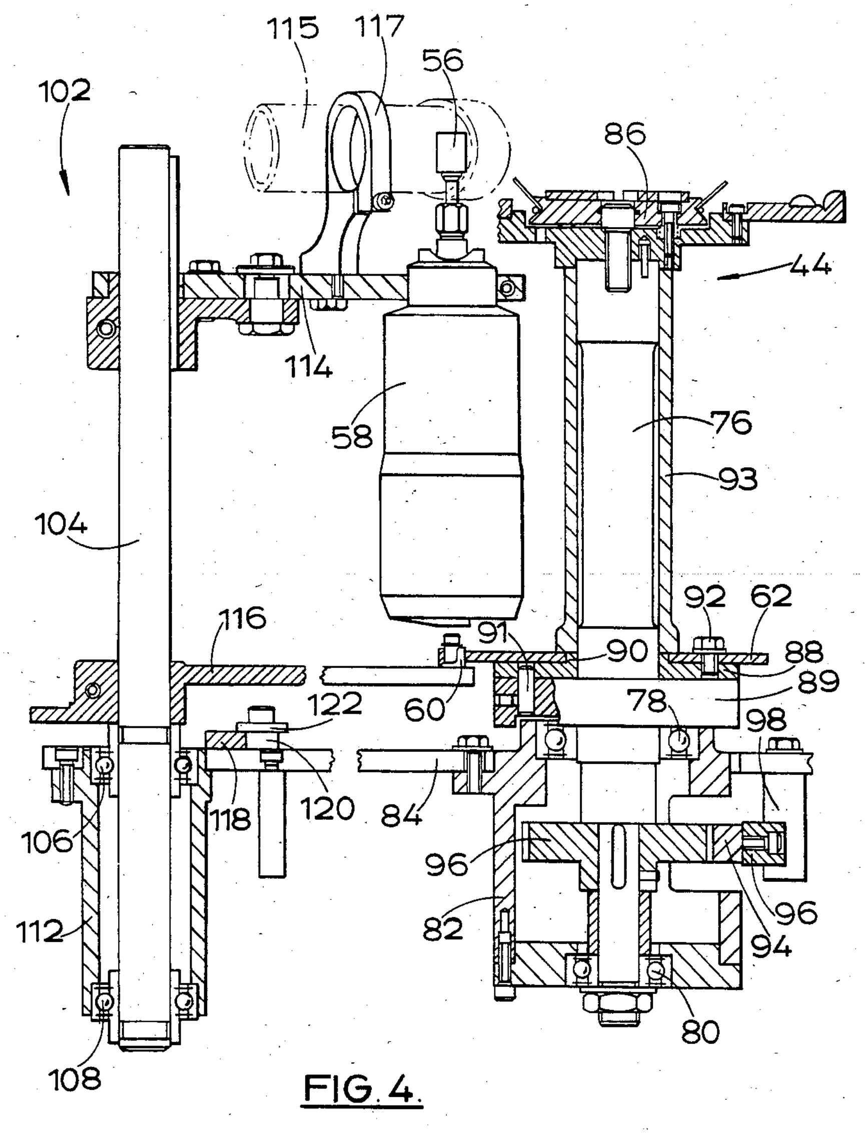
FIG. 4 is a sectional view in elevation showing details of construction of the apparatus at a trimming station.

Also mounted on the platform 84, alongside each of the ware supports 44, is a mounting assembly 102 (see FIG. 4). The assembly 102 comprises a vertical shaft providing a mounting post 104 of which a bottom end portion is rotatably mounted by means of upper and lower bearings 106 and 108 which are mounted in a bearing housing 112; the housing is bolted to the underside of the platform 84, the post 104 projecting upwards through an opening in the platform. Upper and lower arms 114 and 116 are secured to the post 104, the upper arm 114 being generally at the level of the ware-supporting head 86 of the ware support 44 and the lower arm 116 being generally at the level of the profile cam 62. The upper arm 114 serves to carry the electric motor 58 associated with a cutter 56; a neck of the motor is clamped by an end portion of the arm, the motor being arranged with its axis vertical and with the cutter positioned above the motor. An elbow 115 of a dust extraction pipe can be held by means of a bracket 117 secured to the upper arm, the cutter 56 being positioned partly within the mount of the elbow for efficient dust removal. The lower arm 116 serves to carry the cam follower 60 which is mounted on an end portion of the arm to engage the periphery of the cam 62.

Figure 5:
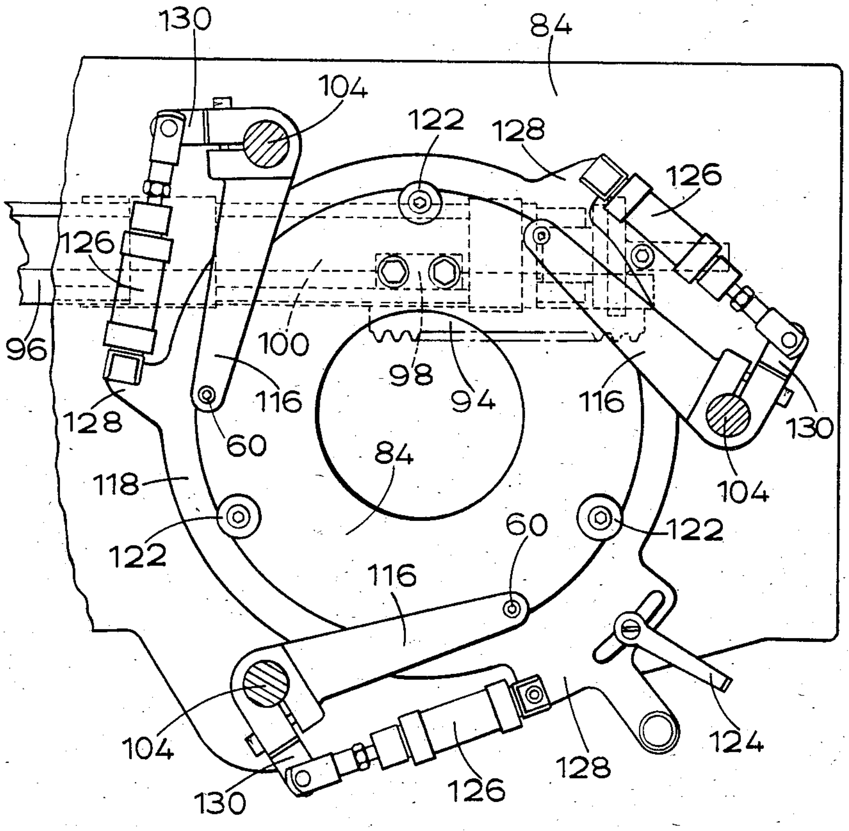
FIG. 5 is a plan view of cutter-engaging mechanism and cutter-advancing mechanism.

Cutter-engaging mechanism of the apparatus is shown in FIG. 5. The mechanism comprises a flat adjustment ring 118 which is secured to the upper side of the platform 84. The ring 118 is located on the platform by means of three locating pegs 120 (see also FIG. 4) which are distributed uniformly about the axis of rotation of the ware support 44, the ring encircling the pegs. Each peg comprises a flange 122 which overlaps an upper surface of the ring, so to hold the ring down on the platform. The rotational position of the ring, about the pegs 120 and the axis of the ware support 44, can be adjusted, the ring being secured in adjusted position by clamping means comprising a clamping lever 124 (Figure 5).

As shown in FIG. 5, the three posts 104 are uniformly distributed about the axis of the ware support 44, outside the ring 118. Engaging means whereby each of the posts 104 can be rotated, to move the cutter 56 into a trimming position determined by contact of the cam follower 60 with the profile cam 62, comprises a pneumatic cylinder 126 arranged to act between a lug 128 of the ring 118 and a lug 130 of the arm 116. Each arm 116 is in the form of bell-crank lever pivoted about the axis of the post 104, the cam follower 60 being mounted adjacent to one end of the lever and the lug 130 being arranged at the other end of the lever.

In setting up the mechanism to trim a particular size and shape of plate, an appropriate profile cam 62 is secured to the ware support 44. With each of the pneumatic cylinders 126 of the cutter-engaging means in a fully extended condition, and correspondingly with the arms 114 and 116 in a fully retracted condition, the clamping lever 124 is adjusted to permit rotation of the adjusting ring 118. Owing to the fact that one end of each cylinder 126 is secured to the ring and each post 104 is secured to the platform 84, rotation of the ring will cause rotation of the arms 114 and 116 (with the post 104). Accordingly a suitable starting position for the cutters 56 (e.g. 3 or 4 mm from the edge of the plate to be trimmed) can be established, and that having been done the ring 118 is again clamped by adjustment of the clamping lever 124. Trimming can then proceed, the cylinders 126 being retracted to advance the cam followers 60 into engagement with the cam 62 and the cutters 56 into engagement with the plate periphery; the pressurised cylinders 126 are chosen to provide, in effect, air springs maintaining the cam followers in contact with the cam throughout a trimming operation. When trimming is completed, air is admitted to the opposite ends of the cylinders 126 to extend them, so to withdraw the cutters 56 from the periphery of the trimmed article.

Figure 6:
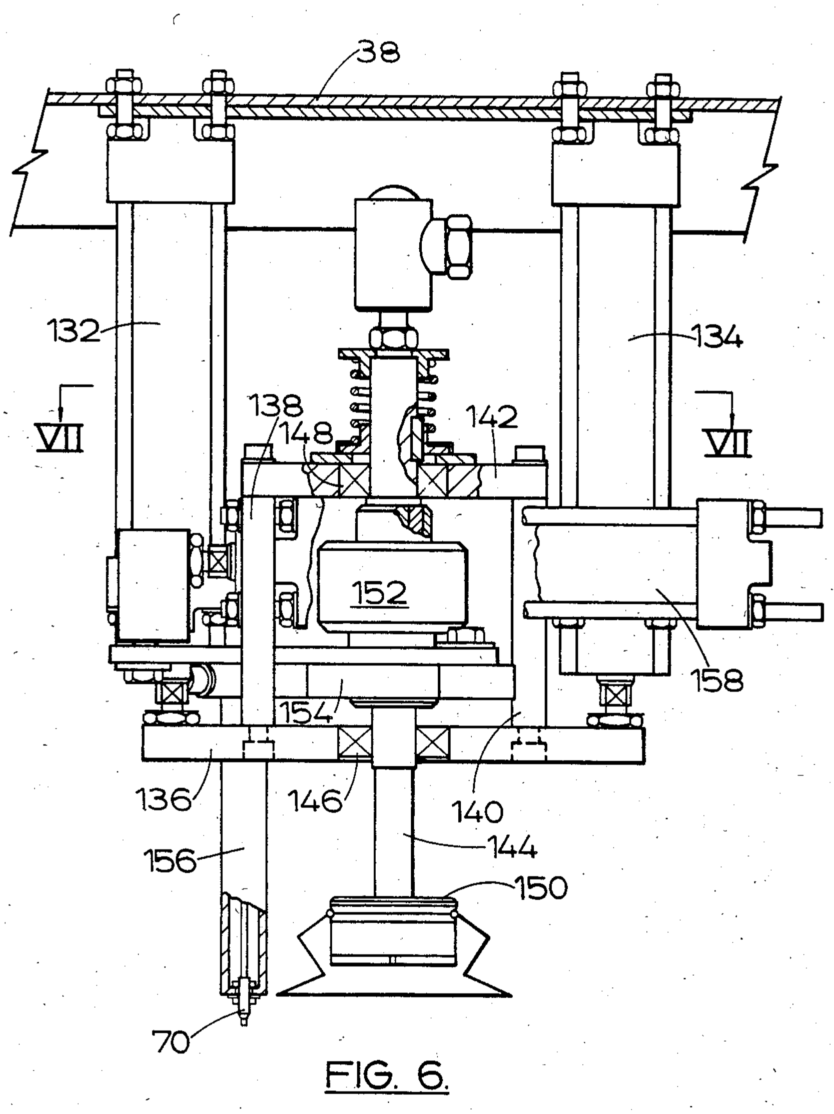
FIG. 6 shows, in elevation, article-holding and orientating mechanism of the apparatus.

Suitable article-holding and orientating mechanism, comprising one sucker unit of the trailing set of sucker units 42 mounted on the loading mechanism 34, will now be described in detail with reference to FIGS. 6 and 7. Whilst the arrangement of this mechanism differs slightly from that illustrated in FIGS. 1 and 2, its basic components and its manner of operation are essentially the same.

Depending from the carriage 38 of the loading mechanism 34 are two fluid pressure operated cylinders 132 and 134 (which correspond in function with the cylinder 55 hereinbefore referred to). The cylinders are arranged with their axes vertical and carry a lower cross-member 136; by actuation of the cylinders the cross-member 136 can be raised and lowered. Supported above the cross-member 136 by means of two spacing blocks 138 and 140 is an upper cross-member 142. A hollow shaft 144 is supported for rotation by bearings 146 and 148 mounted in the lower cross-member 136 and the upper cross-member 142, respectively, and a sucker head 150 is secured to the bottom end of the shaft. (The shaft 144 and sucker head 150 correspond with the sucker 54 referred to hereinbefore.)

A sprag clutch unit 152 (FIG. 6) is mounted on the shaft 144 between the two cross-members 136 and 142. An inner one of two coaxial, relatively rotatable, shafts of the unit 152 is keyed to the shaft 144 and an outer one has clamped to it a scanning arm 154 (see also FIG. 7); the clutch unit permits the scanning arm to rotate independently of the sucker shaft 144 in a clockwise direction only (as viewed in FIG. 7).

The scanning arm 154 is so pivotally mounted for movement about an axis (being also the axis of rotation of the sucker unit) positioned between its opposite ends. A scanning probe 156 depends vertically from the arm 154 on one side of the arm's pivot axis, the position of the probe being adjustable along the arm (i.e. towards and away from the pivot axis). The photocell 70 of the orientating mechanism is mounted at the bottom end of the probe, facing downwards.

Figure 7:
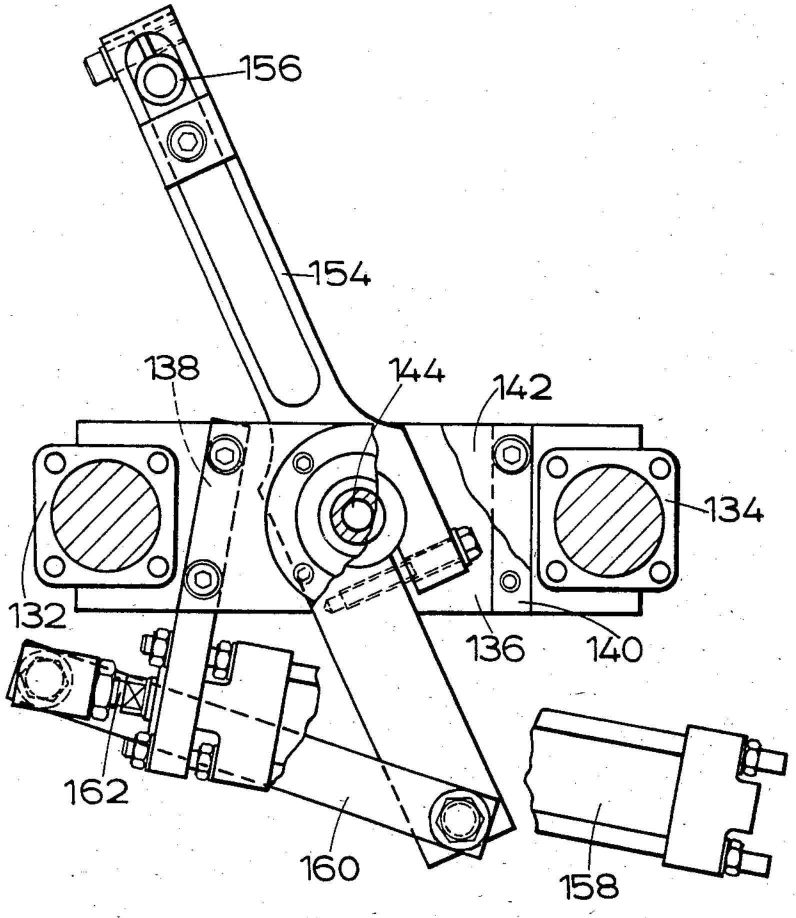
FIG. 7 is a plan view on the line VII—VII of FIG. 6.

Actuating means arranged to move the scanning arm 154 in advance and return pivotal movements, the sucker unit being rotated with the arm during return movements owing to the action of the sprag clutch unit 152, comprises a fluid pressure operated cylinder 158 which is mounted on a portion of the spacing block 138 which projects beyond the cross-members 136 and 142 (see FIG. 7). A connecting link 160 (which together with the scanning arm 154 provides an arrangement which serves the same function as the crank arm 66 hereinbefore referred to) extends between the scanning arm 154 and a piston rod 162 of the cylinder 158, being pivotally connected adjacent to one end to the piston rod 162 and adjacent to its other end to an end portion of the arm 154 on the opposite side of the pivot axis of the arm from the scanning probe 156. The arrangement is such that upon extension of the actuating cylinder 158 the scanning arm is advanced and upon contraction of the cylinder the arm is returned to a datum position determined by the cylinder. The mechanism is operated in essentially the same manner as hereinbefore described with reference to FIG. 2.

We claim:

1. Apparatus for trimming the periphery of an article of ware in the manufacture of ceramic flatware comprising tool-mounting means, article-mounting means, tool-advancing means whereby relative movement can be caused between a rotating rotary trimming tool mounted on the tool-mounting means and an article of ware mounted on the article-mounting means, to cause the tool to trim the article progressively along its periphery, and tool-locating means whereby the tool is so caused to trim the article to a predetermined profile, the apparatus comprising orientating means operative to bring an article to a predetermined orientation for registration with said tool-locating means, said orientating means comprising searching means arranged to detect a predetermined reference feature at the periphery of the article, means arranged to move said searching means to scan the periphery of the article progressively from a datum position until a predetermined disposition relative to the reference feature is assumed, means arranged to return said searching means to its datum position, and means arranged to rotate the article to maintain said relative disposition, whilst said searching means is returned to its datum position, so to bring said reference feature to a position corresponding with said datum position and said article to a predetermined orientation.

2. Apparatus according to claim 1 in which said tool-locating means comprises a profile cam in registration with which an article is located on said article-mounting means in use of the apparatus, a cam follower associated with said tool-mounting means, and engaging means whereby the cam follower can be urged into contact with the profile cam and maintained in contact with the cam during trimming of an article.

3. Apparatus according to claim 1 wherein said article-mounting means comprises a ware support arranged to enable an article to be held down thereon by applied vacuum.

4. Apparatus according to claim 1 wherein said tool-advancing means comprises means arranged to rotate an article on said article-mounting means to cause the periphery of the article to be moved progressively past the tool during trimming.

5. Apparatus according to claim 1 comprising a plurality of such tool-mounting means distributed around said article-mounting means, whereby an article can be trimmed by a plurality of tools operating simultaneously.

6. Apparatus according to claims 1 comprising a centring unit, and loading means arranged to transfer an article from said unit to said article-mounting means after centring of the article on said unit, said orientating means being mounted on said loading means and being arranged to bring the article to said predetermined orientation after centring of the article and before the article is placed on said article-mounting means.

7. Apparatus according to claim 1 comprising smoothing means arranged to smooth the periphery of an article after trimming.

8. Apparatus according to claim 7, in which said smoothing means comprises one or more sponging heads.

9. Apparatus according to claim 7 comprising means arranged to transport an article to said smoothing means after trimming.

* * * * *